Sept. 11, 1951  E. SOLOMON  2,567,244
DEHYDRATION OF ORGANIC ACIDS
Filed March 29, 1947
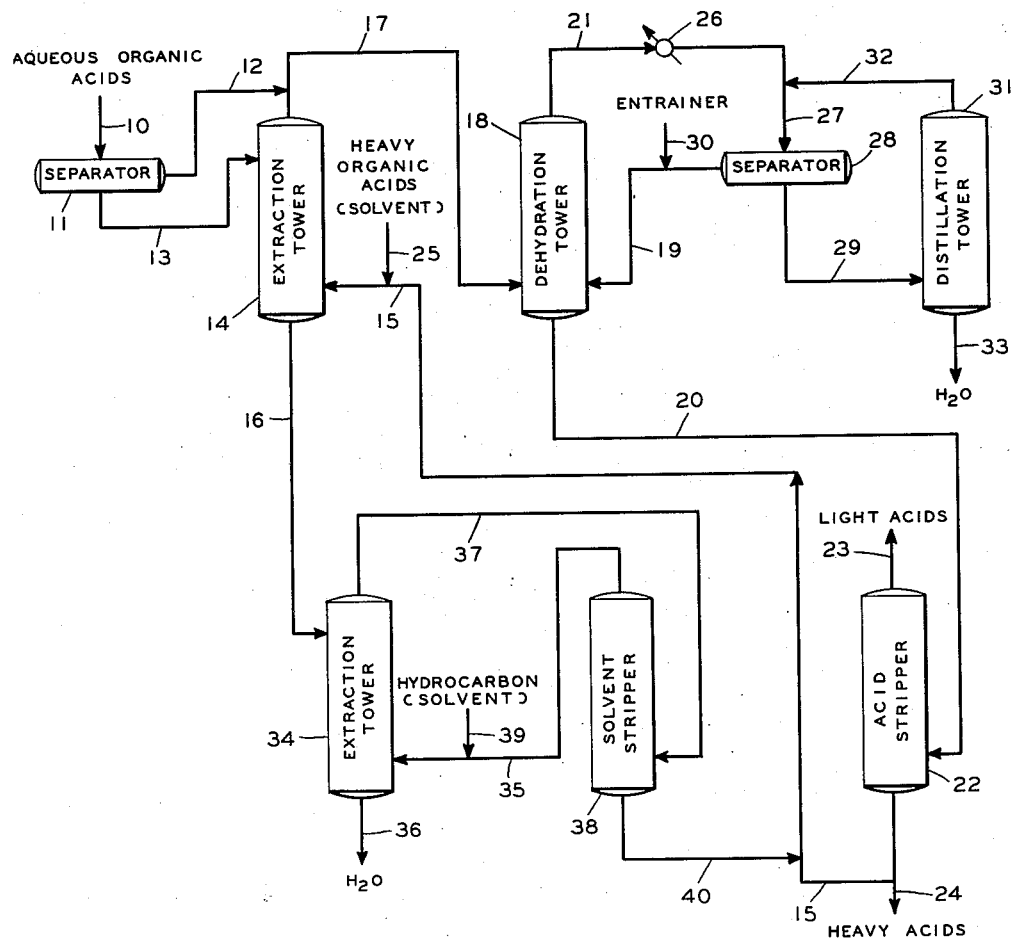
INVENTOR
ERNEST SOLOMON
BY E. F. Liebrecht
G. H. Palmer
ATTORNEYS Patented Sept. 11, 1951

2,567,244

UNITED STATES PATENT OFFICE 2,567,244

DEHYDRATION OF ORGANIC ACIDS

Ernest Solomon, Nutley, N. J., assignor to The M. W. Kellogg Company, Jersey City, N. J., a corporation of Delaware Application March 29, 1947, Serial No. 738,175

6 Claims. (Cl. 260—419)

This invention relates to the dehydration of organic acids and relates more particularly to an improved process for the dehydration of water-soluble fatty organic acids by selective solvent extraction.

Heretofore, various methods have been proposed for dehydration of water-soluble fatty organic acids from their aqueous solutions. The more commonly improved methods utilizing such extraction media as ethyl ether, isopropyl ether, isopropyl chloride, ethyl acetate and the like, have at times proved to be costly in the past. Such conditions are often encountered where dehydration of water-soluble fatty organic acids in dilute aqueous solutions by means of the aforementioned solvents is attempted. The chief disadvantage inherent in the use of solvents of the aforementioned types, lies in their being more volatile than any of the fatty acids to be dehydrated. This necessitates, therefore, the removal of the solvent from the resulting extract by distillation. This is particularly disadvantageous in the case of dilute aqueous solutions of water-soluble fatty organic acids, inasmuch as in such instances the ratio of solvent used to anhydrous acids recovered is large, making it necessary to distill large amounts of solvent per unit of acids recovered.

The present invention is directed to a process, as more fully hereinafter described, for dehydrating water-soluble fatty organic acids, either individually or in mixtures thereof, or mixtures of such acids which contain in addition, water-insoluble fatty acids, from their aqueous solutions by selective solvent extraction, wherein relatively heavier water-insoluble fatty organic acids are employed as the solvent. Water-insoluble fatty organic acids thus employed as the solvent treating agent, either individually or in mixtures thereof, comprise acids having a higher boiling point than any of the acids to be dehydrated. By subjecting the relatively lighter water-soluble fatty organic acids in aqueous solution to extraction with the aforementioned solvent treating agent, substantially all of the lighter acids can be separated from the water and withdrawn in the extract phase, by reason of the solvent action of the heavier acids on the lighter acids. The extract thus obtained can be next subjected to dehydration, followed by the subsequent separation of anhydrous light and heavy acids. All or a portion of the heavy acids thus recovered can be recycled for further use as the solvent in the aforementioned extraction step. Relatively small quantities of the solvent in aqueous solution, obtained as the raffinate in the initial extraction step, can be next recovered by further extraction with a second solvent such as a light hydrocarbon. The hydrocarbon solvent can subsequently be stripped from the acids and the separated hydrocarbon and anhydrous acids returned to their respective circuits.

It is, therefore, an object of the present invention to provide an improved process for dehydrating water-soluble fatty organic acids from their aqueous solutions by selective solvent extraction.

Another object of the invention is to provide an improved process for dehydrating water-soluble fatty organic acids from their aqueous solutions with relatively heavier water-insoluble fatty organic acids.

Still another object of the invention is to provide an improved process for dehydrating water-soluble fatty organic acids from their aqueous solutions by solvent extraction, economically and efficiently.

Other objects and advantages inherent in the invention, will be apparent from the following more detailed disclosure.

The accompanying drawing illustrates, diagrammatically, one form of the apparatus employed and capable of carrying out one embodiment of the process of this invention. While the invention will be described in detail by reference to one embodiment of the process employing the apparatus illustrated in the drawing, it should be noted that it is not intended that the invention be limited to the embodiment as illustrated, but is capable of other embodiments which may extend beyond the scope of the apparatus illustrated in the drawing. Pumps, compressors, valves and other mechanical elements necessary to effect the transfer of liquids and vapors and to maintain the conditions of temperature and pressure necessary to carry out the function of the apparatus, are omitted in order to simplify the description. It will be understood, however, that much equipment of this nature is necessary and will be supplied by those skilled in the art.

Referring to the drawing, an aqueous solution of one or more water-soluble fatty organic acids and possibly containing some water-insoluble fatty acids, is supplied through line 10. This mixture is transferred through line 10 to a separator 11. In this separator, an upper layer is obtained, comprising higher molecular weight organic acids and relatively minor quantities of water. This layer is withdrawn through line 12. The lower layer obtained from separator 11, comprising lower molecular weight organic acids and relatively large quantities of water, is withdrawn through line 13. This layer is next transferred through line 13 to an upper point in an extraction tower 14. In tower 14 the aqueous acid solution thus introduced through line 13 is subjected to intimate countercurrent contact with a solvent treating agent, which comprises one or more substantially water-insoluble fatty organic acids, higher boiling than the boiling point of the acids present in the solution to be treated. In addition, it should be noted that the acid or mixture of acids selected as the treating agent, should be one which can be maintained in the liquid state while passing through the aforementioned extraction step. The treating agent thus employed is introduced into tower 14 at a low point through line 15.

The treating agent and the aqueous acid solution introduced into tower 14 through line 13, as described above, are contacted in this tower under conditions effective to absorb in the treating agent substantially all of the acids contained in the aforementioned aqueous acid solution, and thus separate these acids from water present. As a result of such treatment, a lower water-rich layer containing small quantities of solvent treating agent, and an upper acid-rich layer containing minor quantities of water are formed in tower 14. The lower water-rich layer is withdrawn as a raffinate from tower 14 through line 16 for further treatment in the process hereinafter described. The upper acid-rich layer is withdrawn overhead from tower 14 through line 17.

The upper acid-rich layer from tower 14, comprising an extract containing substantially all of the organic acids in aqueous solution introduced into tower 14 through line 13 and minor quantities of water, are next subjected to dehydration. Conveniently, this may be accomplished by transferring this extract through line 17 to a low point in a dehydration tower 18. An entraining agent such as ethyl ether, isopropyl ether, trichlorethylene, isopropyl chloride or the like, is therefore introduced into tower 18 through line 19. Inasmuch as the acids to be dehydrated in tower 18 contain only minor quantities of water, as stated above, proportionately small quantities of an entraining agent will be required to effect complete acid-dehydration. Tower 18 is next heated under conditions effective to obtain water-free acids as bottoms, which are withdrawn through line 20, and overheads comprising the entraining agent and water, which are withdrawn through line 21 for further treatment in the process hereinafter described. It should be noted that it is possible to combine the aforementioned extract from tower 14, withdrawn through line 17, with the aforementioned upper layer from separator 11, withdrawn through line 12 with which line 17 connects. The streams thus combined, comprising a mixture of high and low molecular weight acids and minor quantities of water, may be next transferred through line 17 for further treatment in tower 18 in the process described above.

As described above, water-free acids obtained as bottoms from tower 18 are withdrawn through line 20. These acids are next transferred through line 20 to a low point in a distillation tower 22 which functions as an acid stripper. In stripper 22, the mixture of water-free acids is heated under proper operating conditions of pressure and temperature effective to separate the lighter molecular weight acids initially introduced into the system through line 10, and the heavier molecular weight acids which comprised the solvent treating agent introduced into tower 14 through line 15. The lighter anhydrous acids thus separated in stripper 22, are withdrawn overhead through line 23 and may be subjected to further distillation for recovery of individual acids by transfer to any conventional acid recovery system, not shown in the drawing. Similarly, anhydrous heavier molecular weight acids comprising the solvent treating agent introduced into tower 14 through line 15 are withdrawn as bottoms from stripper 22, through line 24. A portion of the anhydrous acids thus withdrawn from stripper 22, through line 24 is recycled through line 15, with which line 24 connects, as the solvent treating agent in tower 14 in the process described above. Make-up treating agent may be introduced into line 15 through line 25, with which line 15 connects.

As described above, the overhead from tower 18, comprising the entraining agent and water are withdrawn as vapors through line 21. This overhead is next transferred through line 21 to a condenser 26. Condenser 26 is provided to liquefy the normally liquid components withdrawn as overheads from tower 18. The entraining agent and water thus liquefied are transferred from condenser 26 through line 27 to a separator 28. In separator 28 the mixture thus introduced through line 27, is separated into an upper layer comprising substantially the entraining agent, and a lower water layer containing small quantities of the entraining agent, which is withdrawn through line 29. The upper layer from separator 28, comprising substantially the entraining agent, is recycled through line 19 to a low point in tower 18, for further use as the entraining agent in the process described above. Make-up quantities of the entraining agent are introduced into line 19 through line 30, with which line 19 connects.

As described above, the lower water layer from separator 28 containing small quantities of the entraining agent is withdrawn through line 29. This layer is next transferred through line 29 to a low point in a distillation tower 31, which functions as an entrainer recovery tower. Tower 31 is heated under conditions of temperature and pressure effective to distill overhead substantially all of the entraining agent present in the water-layer introduced through line 29. These overheads are withdrawn through line 32 and recycled into separator 28 through line 27 with which line 32 connects, for further use as the entraining agent in tower 18, in the process described above. Water separated in tower 31, is withdrawn as bottoms through line 33 for further use or treatment outside the scope of the present process.

As hereinbefore described, the lower water-rich layer from tower 14, containing small quantities of the solvent treating agent introduced through line 15, is withdrawn as a raffinate through line 16. This raffinate is next transferred through line 16 to an upper point in an extraction tower 34. In tower 34 this water-rich layer, containing a single heavy organic acid or a mixture of such acids comprising the solvent initially introduced into tower 14 through line 15, is subjected to intimate countercurrent contact with a hydrocarbon solvent treating agent, which is introduced into tower 34 through line 35. This solvent treating agent may comprise a hydrocarbon or a mixture of hydrocarbons preferably having a boiling point substantially lower than that of the acids introduced into tower 34 through line 16 so that it cannot form an azeotrope with any of the acids contained in line 16. However, it is essential that this solvent treating agent have a boiling point sufficiently low so that azeotropic formation with any of the components of the acid solvent in line 15 may be avoided. While the use of a hydrocarbon, or a mixture of hydrocarbons, as a solvent treating agent in the process described, has been found to be overall generally satisfactory, other solvents may be effectively employed. For example, I may employ such solvents as ethyl ether or trichlor-ethylene. A hydrocarbon or a mixture of hydrocarbons as a solvent, of the character described, is preferred inasmuch as its relatively low cost, when compared to other solvents, will obviate the necessity for its subsequent recovery from the water layer in tower 24 in the process hereinafter described.

The hydrocarbon treating agent and the aqueous acid mixture introduced into tower 34 through line 16, as described above, are contacted in this tower under conditions effective to absorb in the treating agent substantially all of the acids contained in the aforementioned aqueous acid mixture and thus separate these acids from water present. As a result of such treatment, an upper hydrocarbon-acid layer, substantially water-free and a lower water layer are formed in tower 34. The lower water layer from tower 34 is withdrawn as bottoms through line 36. The upper hydrocarbon-acid layer from tower 34 is next transferred through line 37 to a low point in a distillation tower 38 which functions as a solvent stripper. Stripper 38 is heated under conditions of temperature and pressure effective to distill overhead substantially all of the hydrocarbon treating agent present in the hydrocarbon-acid mixture introduced through line 37. These overheads are withdrawn and recycled through line 35 for further use as the hydrocarbon solvent in tower 34 in the process described above. Makeup quantities of solvent treating agent are introduced into line 35 through line 39, with which line 35 connects. Bottoms from stripper 38, comprising anhydrous heavy acids, hydrocarbon-free, are withdrawn through line 40 and may be recycled into tower 14 via line 15 with which line 40 connects, as the solvent treating agent in tower 14 in the process hereinbefore described.

To recapitulate, the present invention is directed to an improved process for dehydrating water-soluble fatty organic acids, either individually or in mixtures thereof, from their aqueous solutions by selective solvent extraction. In accordance with the foregoing description, the advantages inherent in this process will be apparent when compared with other methods for obtaining similar acid-dehydration, in that, a highly efficient solvent is employed which is less volatile than the acids to be dehydrated, making it possible, subsequently, to confine distillation to the recovered acids rather than the solvent treating agent.

While a particular embodiment of the invention has been described for purposes of illustration, it should be understood that various modifications or adaptations thereof, which will be obvious to one skilled in the art, may be made within the spirit of the invention as set forth in the appended claims.

Having thus described my invention, what I claim and desire to secure by Letters Patent is:

1. A process for the dehydration of an aqueous solution of a fatty organic acid which comprises subjecting said acid to a first extraction treatment with a first liquid solvent consisting essentially of at least one fatty organic acid whose boiling point is higher than that of the acid to be dehydrated and which is also relatively insoluble in water to obtain a first extract comprising an acid-rich mixture containing said first-mentioned acid, a major portion of said first solvent and a minor portion of water, and a first raffinate comprising a water-rich mixture containing a minor portion of said first solvent, dehydrating said first extract to obtain a mixture of fatty organic acids substantially water-free, subjecting said first raffinate to a second extraction treatment with a second liquid solvent for said first solvent to obtain a second extract comprising a solvent-rich mixture substantially water-free, and containing said first solvent dissolved in said first raffinate, and to obtain a second raffinate comprising water, and separating said first solvent from said second solvent contained in said second extract.

2. A process for the dehydration of an aqueous solution of a fatty organic acid which comprises subjecting said acid to a first extraction treatment with a first liquid solvent consisting essentially of at least one fatty organic acid whose boiling point is higher than that of the acid to be dehydrated and which is also relatively insoluble in water to obtain a first extract comprising an acid-rich mixture containing a major portion of said first-mentioned acid, a major portion of said first solvent and a minor portion of water and a first raffinate comprising a water-rich mixture containing a minor portion of said first-mentioned acid and a minor portion of said first solvent, dehydrating said first extract to obtain a mixture of fatty organic acids substantially water-free, subjecting said first raffinate to a second extraction treatment with a second liquid solvent for said first solvent whose boiling point is sufficiently lower than that of said first solvent effective to prevent azeotropic formation with the acid comprising said first solvent to obtain a second extract comprising a solvent-rich mixture substantially water-free, and containing said first solvent dissolved in said first raffinate, and to obtain a second raffinate comprising water, and separating said first solvent from said second solvent contained in said second extract.

3. A process as defined in claim 2 wherein said second solvent is a hydrocarbon.

4. A process as defined is claim 2 wherein said solvent is ethyl ether.

5. A process for the dehydration of an aqueous solution of a fatty organic acid which comprises subjecting said acid to a first extraction treatment with a first liquid solvent consisting essentially of at least one fatty organic acid whose boiling point is higher than that of the acid to be dehydrated and which is also relatively insoluble in water to obtain a first extract comprising an acid-rich mixture containing a major portion of said first-mentioned acid, a major portion of said first solvent and a minor portion of water and a first raffinate comprising a water-rich mixture containing a minor portion of said first-mentioned acid and a minor portion of said first solvent, subjecting said first extract to distillation with an entraining agent effective to recover water present in said extract as an overhead fraction together with said entraining agent to obtain a mixture of fatty organic acids as a bottoms product substantially water-free, subjecting said first raffinate to a second extraction treatment with a second liquid solvent comprising a hydrocarbon whose boiling point is sufficiently lower than that of said first solvent effective to prevent azeotropic formation with the acid comprising said first solvent to obtain a second extract comprising a hydrocarbon-rich mixture substantially water-free, and containing said first solvent dissolved in said first raffinate, and to obtain a second raffinate comprising water, and separating said first solvent from hydrocarbon contained in said second extract.

6. A process as defined in claim 5 wherein at least a portion of the mixture of fatty organic acids obtained from the dehydration of said first extract is combined with at least a portion of the water-free solvent obtained from said second extract, and the stream thus combined is recycled as the solvent for said first extraction treatment.

ERNEST SOLOMON.

REFERENCES CITED

The following references are of record in the file of this patent:

UNITED STATES PATENTS

| Number | Name | Date |
|---|---|---|
| 1,839,894 | Ricard et al. | Jan. 5, 1932 |
| 1,952,845 | Dreyfus | Mar. 27, 1934 |
| 2,395,010 | Othner | Feb. 19, 1946 |
| 2,430,086 | Staff | Nov. 4, 1947 |

OTHER REFERENCES

Markley, Fatty Acids (1947), Interscience Pub., pp. 176–178.